(12) United States Patent
Abraham et al.

(10) Patent No.: US 7,942,318 B2
(45) Date of Patent: *May 17, 2011

(54) ENHANCING WEB EXPERIENCES USING BEHAVIORAL BIOMETRIC DATA

(75) Inventors: Subil M. Abraham, Plano, TX (US);
Jason A. Gonzalez, Dallas, TX (US);
Hung Tack Kwan, Grand Prairie, TX (US); Mathews Thomas, Flower Mound, TX (US)

(73) Assignee: International Business Machines Corporation, Armonk, NY (US)

( * ) Notice: Subject to any disclaimer, the term of this patent is extended or adjusted under 35 U.S.C. 154(b) by 528 days.

This patent is subject to a terminal disclaimer.

(21) Appl. No.: 12/062,311

(22) Filed: Apr. 3, 2008

(65) Prior Publication Data

US 2008/0215631 A1 Sep. 4, 2008

Related U.S. Application Data

(63) Continuation of application No. 11/057,908, filed on Feb. 15, 2005, now Pat. No. 7,389,917.

(51) Int. Cl.
*G06K 5/00* (2006.01)

(52) U.S. Cl. .................. 235/382; 705/1; 707/600

(58) Field of Classification Search .................. 235/382
See application file for complete search history.

(56) References Cited

U.S. PATENT DOCUMENTS

| | | | |
|---|---|---|---|
| 5,802,292 A | 9/1998 | Mogul | |
| 6,138,156 A | 10/2000 | Fletcher et al. | |
| 6,585,521 B1 | 7/2003 | Obrador | |
| 2003/0033405 A1 | 2/2003 | Perdon et al. | |
| 2004/0030741 A1* | 2/2004 | Wolton et al. | 709/202 |
| 2005/0008148 A1 | 1/2005 | Jacobson | |

FOREIGN PATENT DOCUMENTS

GB 2359696 8/2001

* cited by examiner

*Primary Examiner* — Seung H Lee
*Assistant Examiner* — Tae Kim
(74) *Attorney, Agent, or Firm* — Novak, Druce + Quigg LLP

(57) ABSTRACT

A computerized method that provides a Web page having control structures for gathering behavioral biometrics. The method can receive behavioral biometric data in accordance with the control structures and in accordance with interactions of a user with the Web page. Additionally, the method can compare the received behavioral biometric data with at least one set of previously established values. The user can be profiled based upon comparison results. This profiling can affect the manner in which Web pages are provided to the user as well as the content contained therein.

9 Claims, 2 Drawing Sheets

ENHANCING WEB EXPERIENCES USING BEHAVIORAL BIOMETRIC DATA

CROSS REFERENCE TO RELATED APPLICATIONS

This application is a continuation of, and accordingly claims the benefit from, U.S. patent application Ser. No. 11/057,908, now issued U.S. Pat. No. 7,389,917, which was filed in the U.S. Patent and Trademark Office on Feb. 15, 2005.

BACKGROUND

1. Field of the Invention

The present invention relates to the field of Web content and behavioral biometrics information management and, more particularly, to gathering behavioral biometric data and accordingly adjusting Web content.

2. Description of the Related Art

Despite widespread usage of the Web and the constant growth of Web-based information services and products, user interactions with the Web generally lack humanizing touches, which users expect from other mediums. That is, most Web sites provide a diverse group of users with the same information in the same general format. Such unified delivery of information is generally not well suited or at least not customized for the information consumer.

For example, a child and an adult accessing a Web-based library for topical information will generally be provided with the same information, even though both individuals would receive very different information from a human librarian, who can adapt content based upon the librarian's perceptions of the information requester. In another example, a hurried Web based consumer shopping online receives the same information from the Web as a more relaxed consumer; even though, again, a human salesperson would notice the consumer was in a hurry and assist the customer accordingly.

Conventional attempts to humanize Web sites generally require a user to register with a Web site in some manner. Data, often gathered by surveying the user, specific to the user is recorded for the registered user. Web interactions can then be adjusted in accordance with this stored information. This approach has numerous shortcomings. One shortcoming is that many Web site users simply do not care to take the time to register and will therefore avoid Web sites that ask for registration information in favor of other Web sites. Another shortcoming is that the number of preferences that a user may be prompted for during registration can be so large that most users do not spend the time to properly complete the preferences so that suitable customizations can be enacted. Even when users complete a registration process by filling in all requested fields, the users may not be honest or careful about the provided information for fear of divulging personal information and/or out of a sense of apathy making them indifferent to the quality of information that they provide. Additionally, even though preferences change over time, registered users very rarely update their preferences after an initial registration process.

Registration for Web sites is often enacted to address Web site security concerns. That is, some Web sites contain sensitive information or information that is only available for a fee, both of which are satisfied by requiring a user to login to the Web site and provide an authorizing password. This security approach can be circumvented by an unauthorized user, who has obtained the user identification and authorization information with or without the consent of the authorized user. Although some biometric counter-intrusion measures have been conventionally implemented to provide additional security, conventional teachings have not attempted to implement behavioral biometrics within a Web page code to enhance security for accessing the Web page.

SUMMARY OF THE INVENTION

The present invention describes a method, system, and apparatus for enhancing Web experiences using behavioral biometric data. More specifically, Web pages, called behavioral Web pages, can include control structures designed to gather biometric data from users of the Web pages. This biometric data can be used to determine an identity, mental and/or emotional state of a user and to responsively predict content appropriate for that user. Once this information is known, the user's Web experience can be suitably adjusted.

For example, a Web page serving system can deduce that a user is in a rush based upon the hurried manner in which a mouse and scrollbar is manipulated, and can thereafter modify provided content in an appropriate manner for a user in a rush (i.e. summarizing information, disabling complex interface elements in favor of more simplistic ones, disabling graphics or rendering the graphics at a lower resolution level, etc.). In another example, the behavior of a registered user that provided a name and password to a secure Web site can be inconsistent with a previously recorded behavioral profile established for that user as determined by gathered biometric data. The inconsistency can trigger a security mechanism since there is an increased possibility that someone, who is not the registered user, is attempting to access a Web content to which he or she has not been granted privileges.

In still another example, a user can spend significantly more time viewing Web pages having extensive graphical content than approximately equivalent Web pages having limited graphical content, indicating that the user is interested in graphical content. Once this has been discerned from behavioral biometric data, Web pages having extensive graphical content can be given priority over other Web pages for the remainder of an interactive Web session with the user.

The present invention can be implemented in accordance with numerous aspects consistent with material presented herein. For example, one aspect of the present invention can include a computerized method that provides a Web page having control structures for gathering behavioral biometrics. The method can receive behavioral biometric data in accordance with the control structures and in accordance with interactions of a user with the Web page. Additionally, the method can compare the received behavioral biometric data with at least one set of previously established values. The user can be profiled based upon comparison results. This profiling can affect the manner in which Web pages are provided to the user as well as the content contained therein.

Another aspect of the present invention can include a system for enhancing Web experiences that includes one or more Web pages, a data store, an analysis engine, and a means for adjusting provided Web content responsive to results of the analysis engine. The Web pages can include control structures for gathering behavioral biometrics. The data store can associate previously determined behavior biometrics with behavioral patterns. The analysis engine can compare behavioral biometrics gathered in response to interactions with the Web pages against the previously determined behavioral biometrics within the data store. For example, a user's behavioral pattern can be determined and for the remainder of a Web session, content can be provided in a manner customized for the determined behavioral pattern.

Still another aspect of the present invention can include a system for serving Web pages that includes a Web server, an analysis engine, and/or an inference engine. The Web server can provide Web pages to users. The provided Web pages can include one or more behavioral Web pages, where a behavior Web page includes control structures for gathering behavioral biometrics. The analysis engine can analyze behavioral biometrics gathered in response to the control structures to generate behavioral patterns based upon the analyzed behavioral biometrics. The inference engine can compare the generated behavioral patterns against previously established behavioral patterns to initiate or "fire" events based upon comparison results. Selective programmatic actions can be executed responsive to the events fired by the inference engine. These selective programmatic actions can affect Web pages provided by the Web server.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, any other recording medium, or can also be provided as a digitally encoded signal conveyed via a carrier wave. The described program can be a single program or can be implemented as multiple subprograms, each of which interact within a single computing device or interact in a distributed fashion across a network space.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
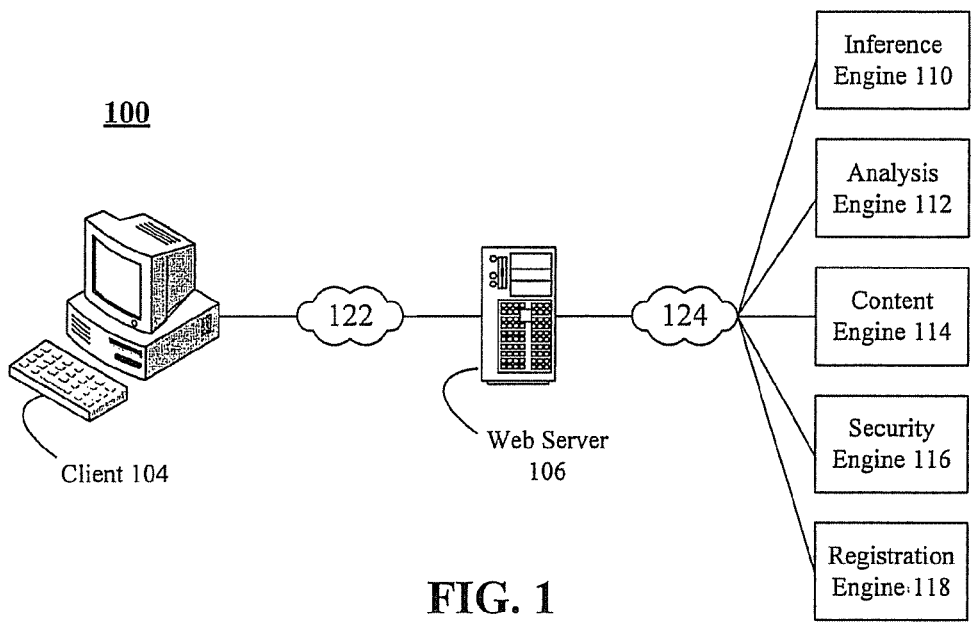
FIG. 1 is a schematic diagram illustrating a system for serving Web pages in accordance with an embodiment of the inventive arrangements disclosed herein.

FIG. 1 is a schematic diagram illustrating a system 100 for serving Web pages in accordance with an embodiment of the inventive arrangements disclosed herein. The system 100 can include a client 104 communicatively linked to a Web server 106 via network 122. Client 104 can be any computing device upon which a browser is disposed, the browser being capable of receiving Web pages from the Web server 106 and rendering the Web pages to a user.

One type of Web page served by the Web server 106 to the client 104 includes a behavioral web page, which can include control structures for gathering behavioral biometrics. User interactions can be monitored by the client 104 to determine behavioral biometrics that correspond to the desired behavioral biometrics as defined by the control structures. These gathered behavioral biometrics can be conveyed back to the Web server 106 so that the user's Web experience can be enhanced in accordance with the behavioral biometrics.

As used herein, biometrics can be defined as the science of analyzing and reacting to the measurable characteristics of an individual, such as an individual utilizing the client 104. Two diverse categories of biometrics are physical biometrics and behavioral biometrics. Physical biometrics focus upon biological or physiological characteristics. Physical biometrics are used within computer science to identify users based upon such characteristics as body odor, ear shape, face recognition, finger geometry, finger image, hand geometry, iris recognition, retina recognition, voiceprint recognition, blood analysis, genetic sampling, and the like.

In contrast, a behavioral biometric is characterized by a behavioral trait that is learned and acquired over time rather than a physiological characteristic. Behavioral biometrics can be based on keystroke dynamics, signature verification, mouse movement and trajectory dynamics, speaker verification, GUI selection dynamics, Web page navigation dynamics, user response time characteristics, eye focus, content consumption preferences, and the like. Behavioral biometrics can be used to determine an identity of a user, a mood of a user, and content a user is focusing upon. Behavioral biometrics can also be used to infer profile characteristics of a user without requiring the user to explicitly enter such information.

Just as many different types of behavioral biometrics exist, each of which can be used to determine characteristics of a user, Web server 106 behavior can be adjusted in many different manners based upon the values of the behavioral biometrics. For example, the Web server 106 can provide more personalized content to the user based upon information deduced from the behavioral biometric information.

In one embodiment, the system 100 can deduce that the user is in a rush because of the hurried manner in which a mouse and GUI scroll bars are used, and can customize Web content for a user in a hurry. In another embodiment, system 100 can conclude that a user is confused or especially interested in a particular item within a Web page based upon user responses to prompts and lack thereof, time spent viewing a Web page, Web page focus, and the like. In response to user interest, the Web server 106 can tailor future Web pages towards that interest. In response to user confusion, the system 100 can automatically contact a customer help service to resolve the inferred confusion.

In still another embodiment, user characteristics can be inferred from the biometric data and used to automatically fill in registration fields or to automatically register a user. Additionally, a user can be categorized based upon the behavioral biometric data and Web pages can be customized in accordance with these categories. For example, a user can be categorized as a young reader, a casual adult reader, or an expert adult reader and Web context can be adjusted in a suitable fashion for the selected category.

In one embodiment, a number of engines can be communicatively linked to Web server 106, each being designed to enhance or alter a Web experience based upon the behavioral biometric data. More specifically, the Web server 106 can be communicatively linked via network 124 to an inference engine 110, analysis engine 112, content engine 114, security engine 116, registration engine 118, and the like.

The analysis engine 112 can analyze behavior biometrics gathered in response to the control structures and to generate behavioral patterns based upon the analyzed behavioral biometrics. For example, the analysis engine 112 can analyze mouse movement, keyboard interactions, time spent viewing a certain type of content, etc. When this analysis results in a statistically significant behavioral pattern, the inference engine 110 can be notified and passed data necessary for the inference engine 110 to take appropriate actions. Accordingly, the analysis engine 112 can translate raw interaction behavioral biometric data into data that is meaningful to the inference engine 110.

The inference engine 110 can compare behavioral patterns of a user of client 104 against a plurality of previously established behavioral patterns. The previously established behavioral patterns can include user-specific patterns as well as user-agnostic behavioral patterns. The inference engine 110 can "fire" events based upon comparison results, where to fire an event means to trigger, start, broadcast, to otherwise initiate an event as well as to detect an event and to responsively execute a programmatic action. That is, firing an event allows one or more programmatic actions linked to the fired event to be taken or allows for the conveyance of an occurrence of an event to be registered in interested software routines or to routines that "listen" for the event where each "listening" routine may take one or more programmatic actions upon being notified of the event. Accordingly, other programs can respond to these fired events so that selective programmatic actions are executed responsive to the fired events. These selective programmatic actions can affect Web pages provided by the Web server 106.

The content engine 114 can customize content of Web pages provided by the Web server 106. The content can be customized based on events of the inference engine 110 that the content engine 114 detects, which triggers designed content engine 114 functions to execute. Additionally, the inference engine 110 can determine one or more content categories relevant for the user. The content category can be conveyed to the content engine 114, which can filter content in accordance to the content category. The content category can be applied to the displayed Web page, to the current Web session, to a permanent user profile, or combinations thereof.

In one embodiment, content categories can be related to the age and/or level of interest of a user. For example, categories can include a young user, a casual adult user, or an expert adult user. In another embodiment, content categories can be related to the mood of a user. For example, categories can include a hostile user, an indifferent user, and a friendly user or can include a rushed user, an impatient user, a normal user, a patient user, and a slow user.

The security engine 116 can execute at least one security mechanism based upon results determined within or events fired by the inference engine 116. A security mechanism can result in such actions as denying the current user access, prompting the user for additional authorization information, notifying a Web site administrator of a potential security breach, logging suspicious activity, enabling heightened monitoring of the user's activities, and other such measures.

The registration engine 118 can register users that are provided Web pages from the Web server 106. In one embodiment, the registration engine 118 can establish, update, and maintain user-specific stores of behavioral biometric data. This information can be used by the inference engine 110 in various ways. For example, the registration information can be used to determine if a user is in an abnormal mood or to determine whether the user is a different individual from the registered individual. In a particular embodiment, the registration engine 118 can survey a user for required information. Particular fields during this registration can be automatically filled-in by the registration engine 118 based upon user traits inferred by the inference engine 110. Alternately, the registration engine 118 can automatically register a user in a user transparent fashion based upon inference engine 110 input. The registration engine 118 can also update registration information or prompt a user to update registration information, when this information conflicts with inferred user characteristics derived from behavioral biometric data.

As shown herein, networks 122 and 124 can represent any communication mechanism capable of conveying digitally encoded information. Each of the networks 122 and 124 can include a telephony network like a Public Switched Telephone Network (PSTN) or a mobile telephone network, a computer network like a local area network or a wide area network, a cable network, a satellite network, a broadcast network, and the like. Further, each of the networks 122 and 124 can use wireless as well as line-based communication pathways. Further still, networks 122 and 124 can represent one or more communication bus or communication lines that can be a physical cable between hardware devices, an etched hardware communication pathway within a processor or circuit board, and the like. Digitally encoded information can be conveyed via network networks 122 and 124 in accordance with any communication protocol, such as a packet-based communication protocol or a circuit based communication protocol.

It should be noted that a Web experience enhancement can be a dynamic enhancement that can alter a Web page currently displayed upon the client 104. Other enhancements can change future Web pages provided to the client 104 for the duration of a Web session. The Web experience enhancement can also be gradually implemented, more persistent enhancements that slowly and unobtrusively occur.

It should be appreciated that the arrangements shown in FIG. 1 are for illustrative purposes only and that the invention is not limited in this regard. Each of the engines 110-118 or portions thereof can be implemented within client 104, within Web server 106, and/or within other computing devices communicatively linked to network 122 and/or network 124. Additionally, the Web server 106 and engines 110-118 can be implemented in a distributed or centralized fashion. Further, the functionality attributable to the various components of system 100 can be combined or separated in different manners than those illustrated herein. For instance, the inference engine 110 and the analysis engine 112 can be implemented as a single integrated component of the Web server 110 in one embodiment of the present invention. In another embodiment of the present invention, the functionality of the registration engine 118 can be implemented within a plurality of engines or plurality of separate software components.

Figure 2:
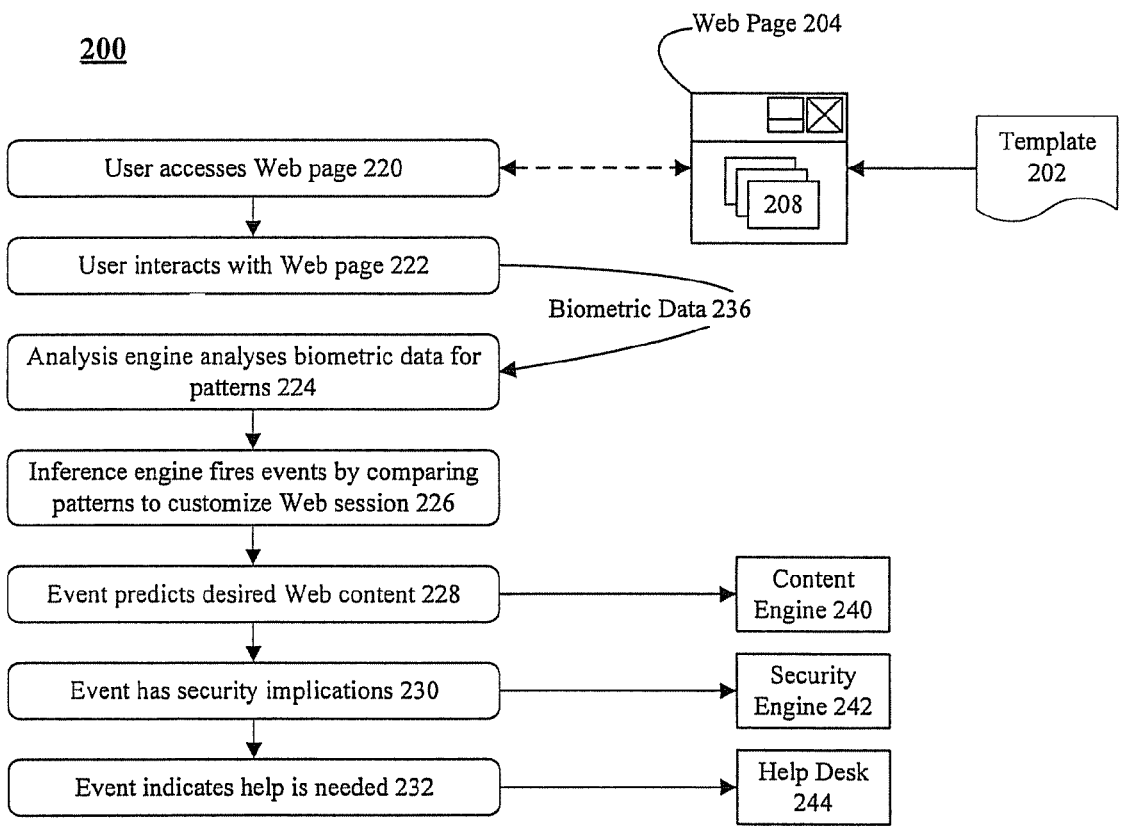
FIG. 2 is a schematic diagram illustrating a system for enhancing a Web experience using behavioral biometrics in accordance with an embodiment of the inventive arrangements disclosed herein.

FIG. 2 is a schematic diagram illustrating a system 200 for enhancing a Web experience using behavioral biometrics in accordance with an embodiment of the inventive arrangements disclosed herein. System 200 can utilize one or more templates 202 to generate a Web page 204. The Web page 204 can include control structures 208 that gather behavioral biometrics from user interactions with the Web page 204. A Web page 204 can be constructed without using template 202, can be constructed using one template 202, or can be constructed using multiple templates 202.

Different categories of templates 202 can exist, each having a customized purpose. For example, one category of template 202 can be a security template designed to determine whether the behavior of a user matches a behavioral pattern established for the user. The security template can include a number of developer configurable parameters that enable the developer to select security mechanisms and actions that are to be triggered when a behavioral mismatch is detected and to select appropriate behavioral thresholds for triggering these mechanisms.

Another category of template 202 can be a mood template designed to determine a user's current mood by comparing the behavior of the user against previously established mood-specific behavioral patterns. Functions can be provided that adjust Web page 204 parameters to suit the mood of the user. For example, a user in a rushed mood can be presented with fewer controls and options than a user in a contemplative mood.

Still another category of template 202 can be a user-characteristic template designed to categorize the user according to age, interest level, or other user characteristic inferred from the behavioral patterns of the user. Functions included in a user-categorizing template can include parental controls or filters and information depth controls that adjust the amount of information provided in accordance with user inferred user characteristics. Both the mood template and the user-characteristic template can be grouped into a more generic category of templates called content templates, which adjust content of Web pages based upon gathered behavioral biometrics.

Regardless of how the Web page 204 is constructed, the Web page 204 can be made available to users via the Internet, an intranet, or some other network connection. Flow 220 indicates that a user can access the Web page 204 remotely. Flow 222 indicates that the user can interact with the accessed Web page, such as through a browser. During these interactions and based upon control structures 208 of the Web page 204, behavioral biometric data 236 can be derived. In flow 224, an analysis engine, such as analysis engine 112 of system 100, can analyze the biometric data 236 for patterns. In flow 226, an inference engine can fire events relating to results achieved by comparing the analyzed behavioral patterns with other previously established behavioral patterns.

For example, when desired Web content can be deducted by comparing behavioral patterns, a content event can be fired, as shown in flow 228. A content event can cause a content engine 240 to responsively execute content-based actions. In flow 230, when a fired event has security implications, a security event can be fired that causes a security engine 242 to responsively execute one or more security mechanisms.

System 200 is not limited in regard to the type of events that can be fired responsive to behavioral patterns nor to the systems that can perform actions in response to these events. For example, as shown by flow 232, a behavioral pattern can indicate user confusion causing a help event to be fired. The help event can notify a help desk 244 of the user's confusion. In one embodiment, the help desk 244 can be a manned customer support center and the help event can cause a human agent to call the user to pro-actively offer help. In another embodiment, the help desk 244 can be an automated system or software agent. The software agent can query the user's machine for a log file, can determine the source of the user's confusion, and can responsively provide confusion resolving suggestions. Notably, all of these "help" measures can be automatically triggered based upon behavioral biometric data and not triggered based upon an explicit user request, which shows by example the flexible nature of programmatic actions which can be enabled based upon behavioral biometric information techniques.

Figure 3:
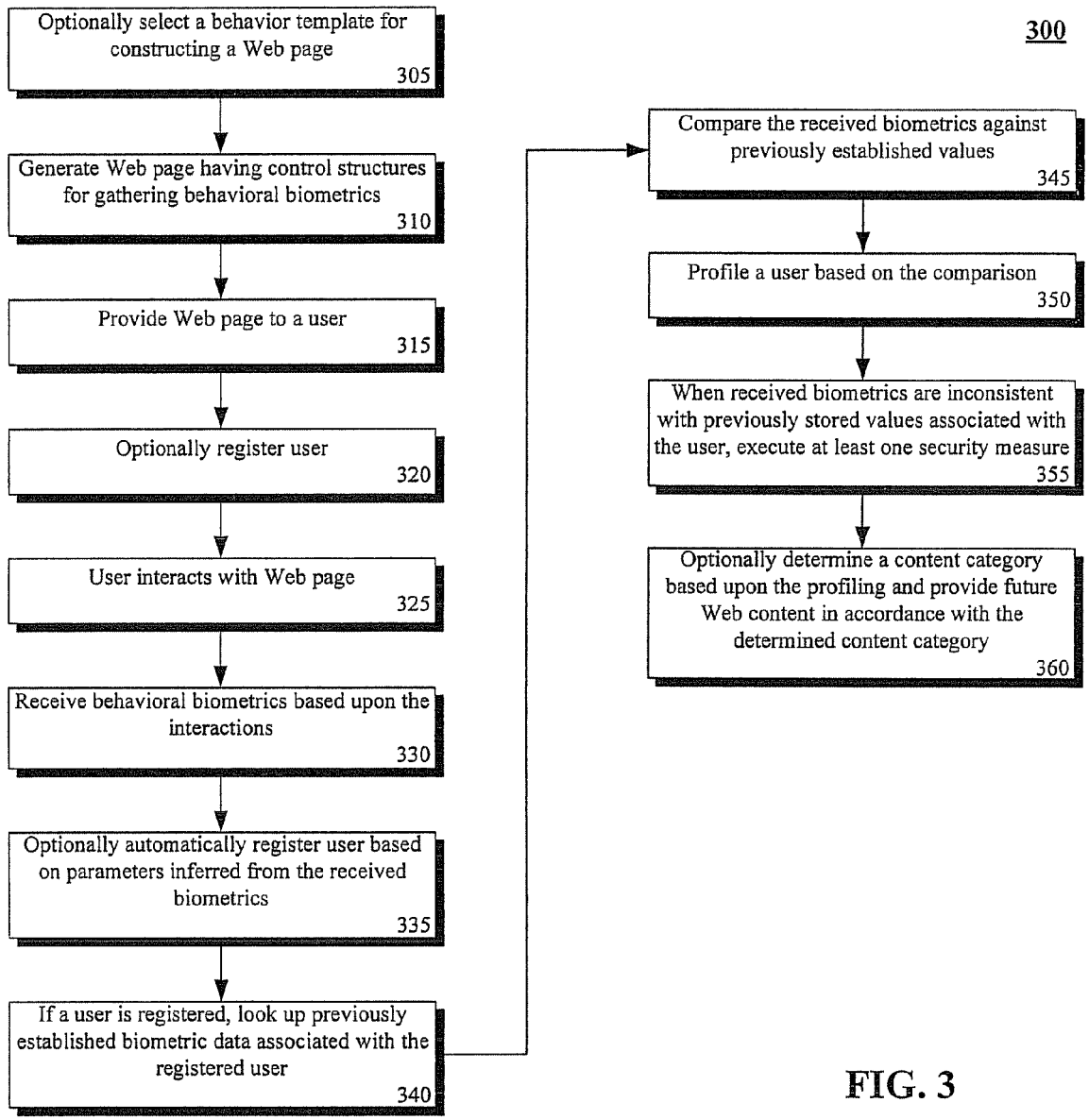
FIG. 3 is a flowchart of a method for enhancing a Web experience using behavioral biometrics in accordance with an embodiment of the inventive arrangements disclosed herein.

FIG. 3 is a flowchart of a method 300 for enhancing a Web experience using behavioral biometrics in accordance with an embodiment of the inventive arrangements disclosed herein. Method 300 can be preformed in the context of a system 100, system 200, or any other system where Web pages that gather behavioral biometric data are provided to users.

The method 300 can begin in optional step 305, where a Web page that includes behavioral biometric control structures can be used to construct a behavioral Web page. The use of a template having the requisite code in a pre-constructed form can save significant development time for Web page developers. Further, maintenance time can be reduced through the use of standardized templates rather than using Web page specific code. When templates are used to construct behavioral Web pages, the template can include developer-configurable parameters to adjust the behavior of the template provided control structures. In step 310, regardless of whether a template is used, a Web page having control structures for gathering behavioral biometrics can be generated.

In step 315, the generated Web page can be provided to a user, responsive to a user request. In step 320, the user can optionally register with the Web site. In step 325, the user can interact with the Web page using a Web browser. In step 330, behavioral biometrics can be generated from these interactions, which can be conveyed to the Web server, which provided the Web page. The generated behavioral biometrics can be dependent upon the input peripheral used to interact with the Web page and based upon the code contained within the Web page control structures. In step 335, when a user has not already registered, the user can optionally be automatically registered based on parameters and user characteristics inferred from the received behavioral biometrics.

In step 340, if a user is registered, previously established biometric data associated with the registered user can be looked up. In step 345, the received biometrics can be compared against previously established values. These values can include looked-up user specific values as well as user agnostic values. In step 350, a user can be profiled based on the comparison. In step 355, when the received biometrics are inconsistent with previously stored values associated with the user, at least one security measure can be executed. In step 360, a content category can be optionally determined based on the profiling. Future Web content can be customized in accordance with the determined content category.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A system for enhancing Web experiences comprising:
   a plurality of Web page templates corresponding to different categories, each category being associated with a particular one of a plurality of identifiable moods of a user;

at least one Web page comprising control structures for gathering behavioral biometrics, wherein the Web page is generated by determining a particular mood of the user based upon the behavioral biometrics and by constructing the Web page using at least one template selected from a category associated with the particular mood of the user;

a data store that associates previously determined behavior biometrics with behavioral patterns;

an analysis engine for comparing behavioral biometrics gathered in response to interactions with the at least one Web page against the previously determined behavioral biometrics within the data store; and means for adjusting provided Web content responsive to results of the analysis engine.

2. The system of claim 1, wherein the Web page further comprises:

template code extracted from at least one behavioral template from which the Web page was constructed.

3. The system of claim 2, wherein one of said categories of Web page templates is a content template configured to gather behavioral biometric data used to determine a user category, wherein the content adjusting means adjusts content in accordance with the determined user category.

4. The system of claim 3, wherein one of said categories is a security template that includes a function to execute at least one security action responsive to gathered behavioral biometrics that are inconsistent with behavioral biometrics established for a user that is believed to be interacting with said at least one Web page.

5. A system for serving Web pages comprising:

a Web server configured to provide at least one Web page to users, said at least one Web page including at least one behavioral Web page, said behavioral Web page comprising control structures for gathering behavioral biometrics, wherein the Web server comprises a plurality of Web page templates corresponding to different categories, each category being associated with a particular one of a plurality of identifiable moods of a user, and wherein the at least one Web page is generated by determining a particular mood of the user based upon the behavioral biometrics and by constructing the at least one Web page using at least one template selected from a category associated with the particular mood of the user;

an analysis engine configured to analyze behavior biometrics gathered in response to the control structures and to generate behavioral patterns based upon the analyzed behavioral biometrics; and an inference engine configured to compare the generated behavioral patterns against a plurality of previously established behavioral patterns and to fire events based upon comparison results, wherein selective programmatic actions are executed responsive to the events fired by the inference engine, wherein the selective programmatic actions affect Web pages provided by the Web server.

6. The system of claim 5, wherein said Web page template further includes developer-configurable routines, wherein the routines are used to gather the behavior biometrics for the control structure.

7. The system of claim 5, further comprising:

a content engine configured to customize content of Web pages provided by the Web server in accordance with a plurality of established content categories, wherein for a Web session one of the plurality of categories is selected for use during the Web session based upon the events fired by the inference engine.

8. The system of claim 5, further comprising:

a security engine configured to execute at least one security mechanism based upon the events fired by the inference engine, said security mechanism performing at least one action selected from the group consisting of disabling a user's access to Web pages served by the Web server, notifying an administrator of a potential security breach, and enabling heightened monitoring of a user's activities.

9. The system of claim 5, further comprising:

a registration engine for registering users that are provided Web pages, said registration engine being further configured to establish, update, and maintain user-specific stores of behavioral biometric data used by the inference engine.

* * * * *